United States Patent
Yoshihara et al.

(10) Patent No.: US 8,011,344 B2
(45) Date of Patent: Sep. 6, 2011

(54) ENGINE AIR INTAKE SYSTEM FOR ENGINE-POWERED WALK-BEHIND WORKING MACHINE

(75) Inventors: Yoshio Yoshihara, Wako (JP); Shuhei Maruyama, Wako (JP); Teruyuki Saitoh, Wako (JP); Hitoshi Abe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 344 days.

(21) Appl. No.: 12/455,504

(22) Filed: Jun. 3, 2009

(65) Prior Publication Data

US 2009/0301421 A1 Dec. 10, 2009

(30) Foreign Application Priority Data

Jun. 5, 2008 (JP) ................. 2008-148192

(51) Int. Cl.
*F02B 77/04* (2006.01)
*B01D 50/00* (2006.01)
(52) U.S. Cl. .................. 123/198 E; 55/385.1
(58) Field of Classification Search ............. 123/184.21, 123/198 E; 55/385.1
See application file for complete search history.

(56) References Cited

U.S. PATENT DOCUMENTS

| 2,754,809 A | 7/1956 | Hainke |
| 4,212,659 A | 7/1980 | Magrini |
| 5,794,733 A | 8/1998 | Stosel et al. |
| 2005/0217222 A1 | 10/2005 | Hsu et al. |

FOREIGN PATENT DOCUMENTS

| DE | 203 16 737 U1 | 12/2003 |
| EP | 0974256 A2 | 1/2000 |
| GB | 2011273 A | 7/1979 |
| JP | S62-59754 | 4/1987 |
| JP | 07-247927 | 9/1995 |

*Primary Examiner* — Noah Kamen
(74) *Attorney, Agent, or Firm* — Carrier Blackman & Associates, P.C.; Joseph P. Carrier; William D. Blackman

(57) ABSTRACT

An engine air intake system for an engine-powered working machine includes a lever cover which covers at least a base portion of an operation control lever mounted on an operation handle for operation by a human operator to control operation of at least one of the working machine and an engine of the working machine, a lower cover disposed inside the lever cover so as to define jointly with the lever cover a hollow space, an air intake portion having an air inlet opening and disposed in the lever cover such that at least the air inlet opening is disposed within the hollow space, and a fresh air guide hose interconnecting the air intake portion and the interior of an air-cleaner case.

5 Claims, 10 Drawing Sheets

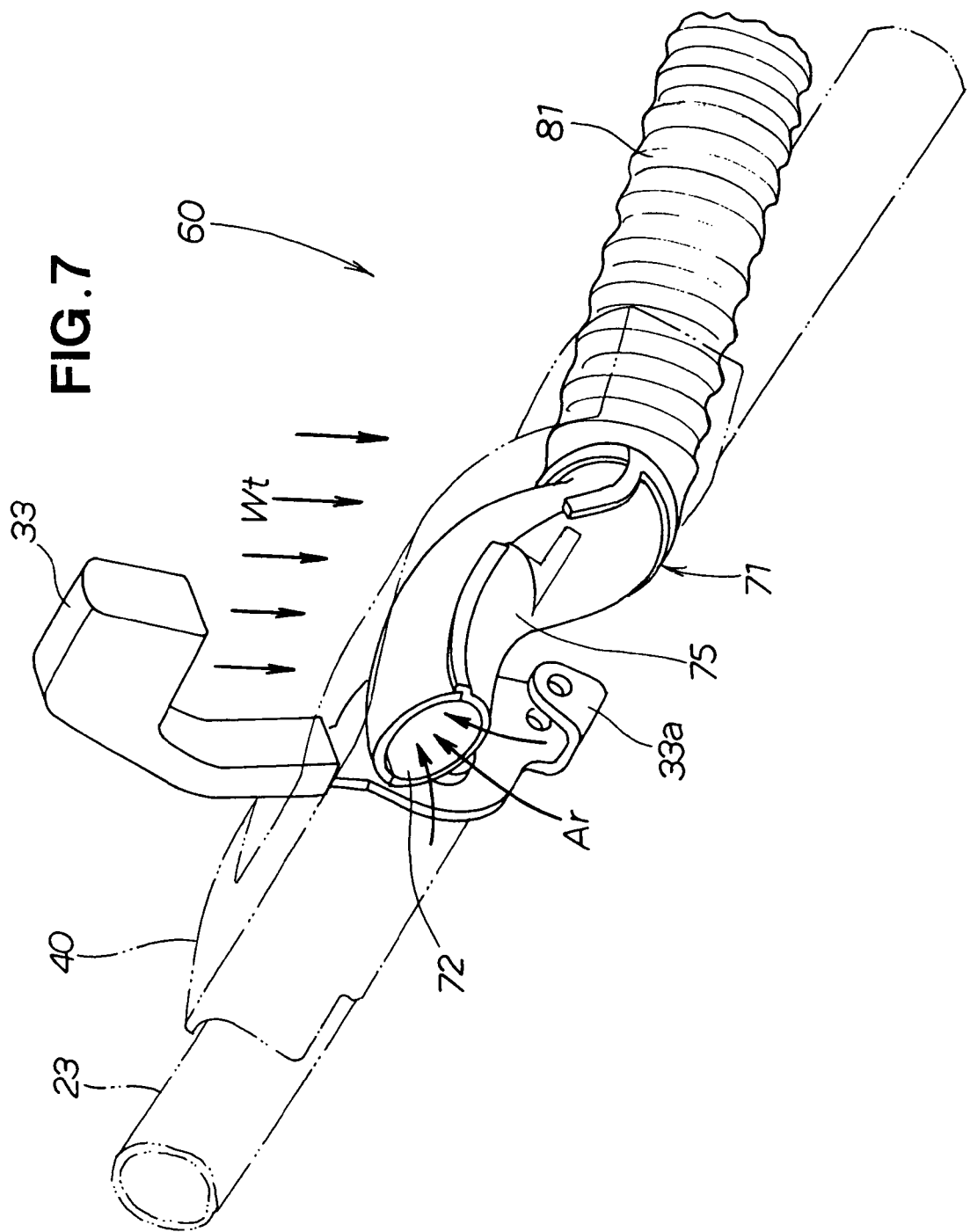

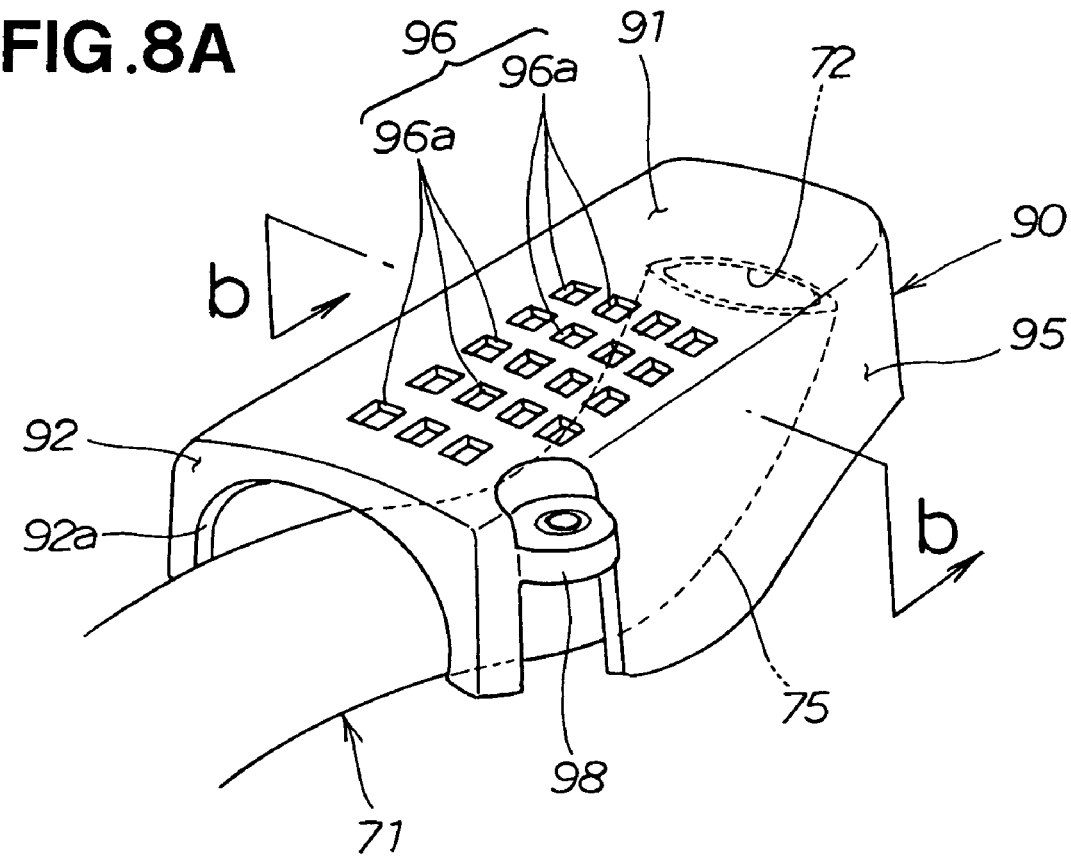
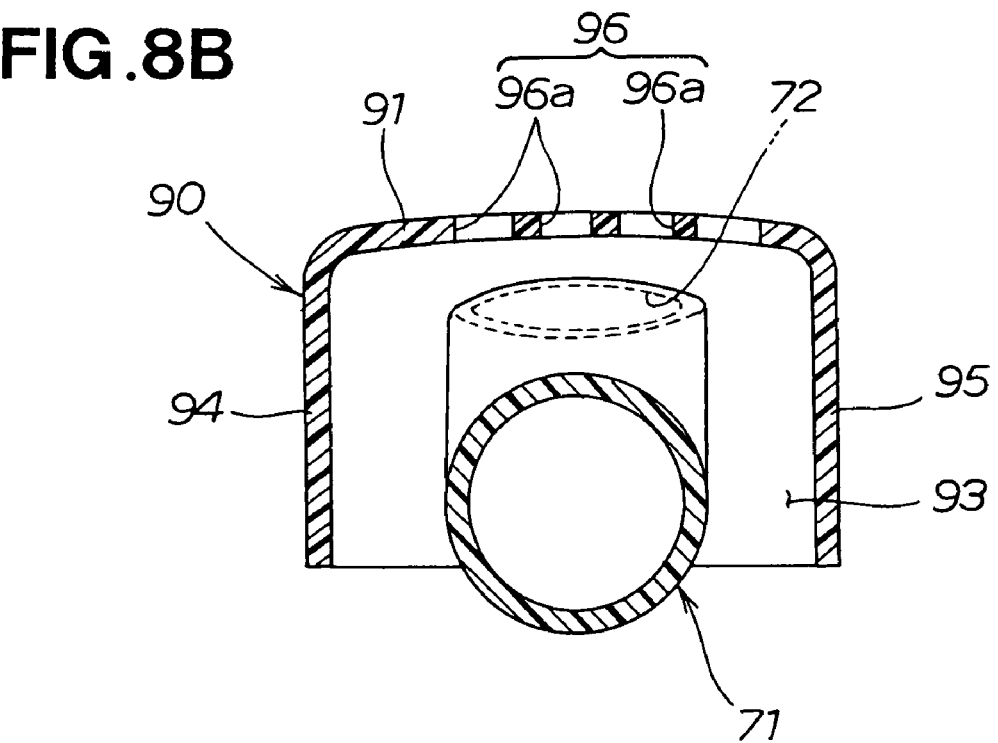

ENGINE AIR INTAKE SYSTEM FOR ENGINE-POWERED WALK-BEHIND WORKING MACHINE

FIELD OF THE INVENTION

The present invention relates generally to an air intake system for an engine installed in a walk-behind working machine, and more particularly to such an engine air intake system for an engine-powered walk-behind working machine having a handle-mounted air snorkel.

BACKGROUND OF THE INVENTION

Engine-powered walk-behind working machines are often operated in dusty conditions. Working in a dusty environment, an engine air intake system of the working machine needs an effective countermeasure against dust ingestion. In case of an engine-powered lawnmower, dust and grass clippings generated during mowing operation may cause clogging of an air-cleaner element of the engine air intake system, resulting in a premature lawnmower engine failure. It is therefore advisable to take appropriate measures to avoid clogging of the air-cleaner element.

Examples of such anti-clogging measures proposed heretofore are disclosed in Japanese Utility Model Laid-Open Publication (JP-U) No. 62-59754 and Japanese Patent Laid-Open Publication (JP-A) No. 7-247927, which employ a so-called "snorkel air-cleaner structure" having an air inlet opening disposed adjacent to a handlebar of the working machine at a position far away from the ground surface in order to introduce fresh air into an air-cleaner, and a hose connecting the air inlet opening to the air-cleaner.

The snorkel air-cleaner structure shown in JP-U 62-59754 is incorporated in an engine-powered bush cutter including an engine, an air intake system for the engine, and an operation handle. The air intake system includes an air-cleaner mounted on the engine, an air intake portion (snorkel) mounted on the handle, and a hose that introduces the outside air from the air intake portion into the air-cleaner.

The snorkel air-cleaner structure disclosed in JP-A 7-247927 is incorporated in an engine-powered lawnmower having an engine, an air intake system for the engine, and an operation handle. The air intake system includes an air-cleaner mounted on the engine, an air intake portion mounted on the handle, and a fresh air intake conduit that introduces the outside air from the air intake portion into the air-cleaner.

The working machines such as bush cutters or lawnmowers are usually used outdoors and sometimes washed with water. This will require the air intake system to have appropriate means for preventing water ingestion, which may otherwise occur when the working machines are subjected to rainfall or washed with water. In order to secure a desired performance of the air-cleaner, care must be taken to keep the air-cleaner from deterioration by water ingestion occurring at the air inlet opening. Thus, there is still room for improvement in the conventional engine air intake system having a snorkel air-cleaner structure.

It is therefore an object of the present invention to provide an engine air intake system for an engine-powered walk-behind working machine having a snorkel air-cleaner structure, which is highly resistant to both of dust ingestion and water ingestion.

SUMMARY OF THE INVENTION

According to the present invention, there is provided an engine air intake system for an engine-powered walk-behind working machine having an operation handle connected at one end to a body of the working machine for operation by a human operator to steer the working machine, and an operation control lever mounted to the operation handle for operation by the human operator to control operation of at least one of the working machine and an engine mounted on the body of the working machine. The engine air intake system comprises: an air-cleaner case mountable on the engine and having an air-cleaner element accommodated within the air-cleaner case; a first cover which covers at least a base portion of the operation control lever from above; a second cover disposed inside the first cover so as to define jointly with the first cover a hollow space, the hollow space communicating with the outside air; an air intake portion having an air inlet opening for introducing therefrom the outside air into the air intake portion, the air intake portion being disposed in the first cover such that at least the air inlet opening is disposed within the hollow space defined between the first and second covers; and a fresh air guide conduit interconnecting the air intake portion and an internal space of the air-cleaner case.

Since a part of the air intake portion including the air inlet opening is received in an hollow space defined between the first and second covers, this arrangement ensures that the outside air is first introduced from the air inlet opening into the air intake portion via the hollow space and thence introduced into the air-cleaner case via the fresh air guide conduit. Because the air inlet opening is surrounded jointly by the first and second covers, this arrangement is able to prevent water ingestion which may otherwise occur at the air inlet opening when the working machine is subjected to rainfall or washed with water. By thus providing the air inlet opening which is highly resistant to water ingestion, the air-cleaner element is able to offer the best possible performance. Furthermore, since the filtered fresh air is free from water, a carburetor and the engine have no risk of encountering a problem resulting from water ingestion.

In the case where the operation handle is forwardly foldable about a proximal end thereof, when the operation handle is turned in a forward direction to assume a forwardly folded horizontal storage position, the air inlet opening is covered by the second cover from above. This arrangement will prevent water from getting into the air intake portion from the air inlet opening.

Additionally, since the air inlet opening of the air intake portion is surrounded jointly by the first and second covers, dust produced during operation of the working machine can hardly enter the air intake portion from the air inlet opening. Furthermore, because the air intake portion formed with the air inlet opening is disposed adjacent to the operation control lever mounted on the operation handle 18 of the working machine, the air inlet opening of the engine air intake system is located far away from the ground surface. By thus arranging the air inlet opening, the air-cleaner element is kept substantially from clogging which may otherwise occur due to dust produced during operation of the working machine.

The first cover serves also as an upper cover which defines the hollow space together with the second cover. This arrangement obviates the need for a separate upper cover for closing the open upper side of the second cover and is able to achieve corresponding reduction in production cost of the engine air intake system.

Preferably, the second cover has a perforated portion of net-like structure for allowing passage therethrough of the outside air, the perforated portion and the air inlet opening being held out of vertical alignment with each other. The perforated portion of the second cover may be offset from the air inlet opening in a forward direction of the working machine. By thus offsetting the perforated portion from the air inlet opening, the rainwater cannot reach the air inlet opening via a part of the labyrinthine air flow passage which is formed jointly by perforations of the perforated portion, an outer peripheral surface of the air intake portion and a peripheral wall of the second cover. Instead, the rainwater is drained from a cutout recess formed in the second cover before it arrives at the air inlet opening of the air intake portion. The perforated portion having a net-like structure is highly effective to block-passage of foreign matter such as dust, insects or small pieces of stone.

Preferably, the air inlet opening of the air intake portion faces in a downward direction, and the air intake portion has a curved part of upwardly convexed configuration extending contiguously from the air inlet opening.

Since the air inlet opening faces in a downward direction, this arrangement is particularly effective to prevent water ingestion which may otherwise occur at the air inlet opening when the working machine is subjected to rainfall or washed with water. Furthermore, by virtue of the curved portion of upwardly convexed configuration extending contiguously from the air inlet opening, the air intake portion is able to drain water by gravity from the air inlet portion even when water ingestion occurs at the air inlet portion.

Preferably, the air intake portion and the second cover are connected to the first cover by a common fastener. This arrangement is able to reduce a total number of fasteners and increase the assembling efficiency.

BRIEF DESCRIPTION OF THE DRAWINGS

One preferred embodiment of the present invention will be described in detail below, by way of example only, with reference to the accompanying drawings, in which:

FIG. 7 is a perspective view of an air intake portion of the engine air intake system as viewed from a widthwise central portion of the lawnmower;

FIG. 8A is a perspective view showing the positional relationship between a lower cover and the air intake portion;

FIG. 8B is a cross-sectional view taken along line b-b of FIG. 8A;

DETAILED DESCRIPTION OF THE PREFERRED EMBODIMENT

Figure 1:
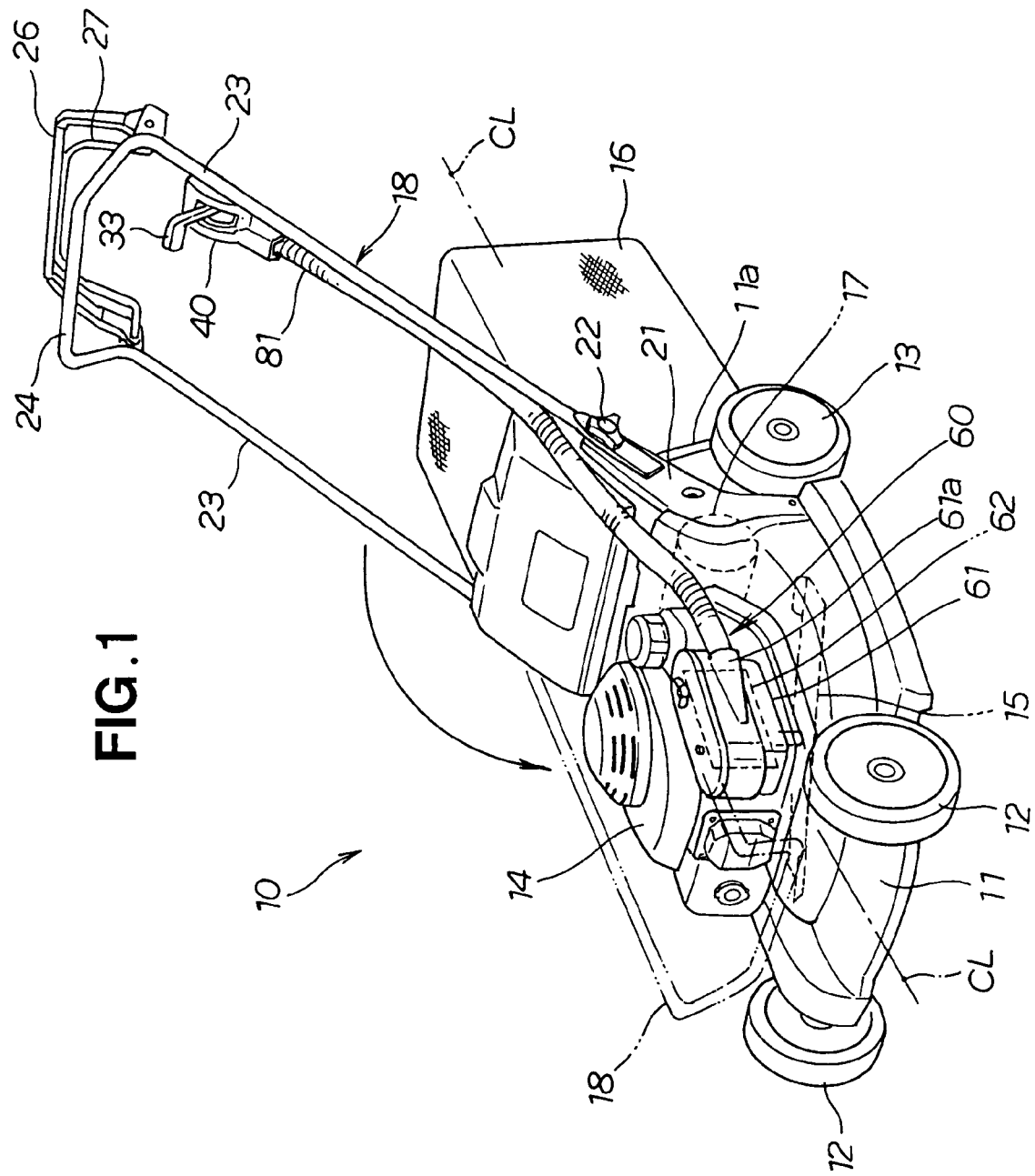
FIG. 1 is a perspective view of an engine-powered self-propelled walk-behind lawnmower in which an engine air intake system embodying the present invention is incorporated.

Referring now to the drawings and FIG. 1 in particular, there is shown an engine-powered self-propelled walk-behind working machine comprised of a lawnmower 10 in which an air intake system 60 embodying the present invention is incorporated. The engine-powered self-propelled walk-behind lawnmower (working machine) 10 generally comprises a cutter deck 11 open downward, a pair of front wheels 12 provided at a front end portion of the cutter deck 11, a pair of rear wheels 13 provided at a rear end portion of the cutter deck 11, an engine 14 mounted on a top wall of the cutter deck 11, a cutter blade 15 disposed inside the cutter deck 11, a grass catcher 16 removably connected to a discharge opening 11a provided at a rear portion of the cutter deck 11, a transmission 17 disposed in a rear portion of the cutter deck 11, and an operation handle 18 extending in an obliquely upward and rearward direction from the rear end portion of the cutter deck 11. The lawnmower 10 constitutes a self-propelled walk-behind working machine having an operation handle for operation by a human operator. The operation handle 18 is provided for operation by the human operator to steer the lawnmower 10.

The front and rear wheels 12, 13, the engine 14 and other main parts of the lawnmower 10 are mounted to the cutter deck 11 and, therefore, the cutter deck 11 serves also as a frame or boy of the lawnmower 10. The engine 14 is a power source that operates to drive the cutter blade 15 via a working clutch (not shown) and also to drive the rear wheels 13 via the transmission 17. The transmission 17 is configured to continuously varying the rotational speed of the rear wheels 13 within a range of from zero (0) to a predetermined high speed. The transmission 17 has a clutch function to selectively make or block transmission of power from the engine 14 to the rear wheels 13. While the clutch is in a disengaged state, the rear wheels 13 remain at rest. When the clutch is engaged, the rear wheels 13 start to rotate in a predetermined direction. The grass catcher 16 is a fabric bag for receiving therein grass clippings cut by the cutter blade 15.

The operation handle 18 is pivotally connected to a handle support portion 21 provided at a rear upper portion of the cutter deck 11 so that the operation handle 18 is pivotally movable in a front-back direction parallel to a longitudinal centerline CL of the lawnmower 10. While the lawnmower 10 is in use, the operation handle 18 is disposed in an operating position in which the operating handle extends obliquely upward and rearward from the handle support portion 21, as indicated by solid lines shown in FIG. 1. Conversely, while the lawnmower 10 is not in use, the operation handle 18 is disposed in a storage position in which the operation handle 18 are forwardly folded to lie in a substantially horizontal plane, as indicated by phantom lines shown in FIG. 1. When the operating handle 18 is to be turned to move between the solid-lined operating position and the phantom-lined storage position, a knob 22 is loosened and the operation handle 18 is turned in either a forward direction or a backward direction.

The operation handle 18 includes left and right handlebars 23, 23 extending obliquely upward and rearward from the handle support portion 21, and a horizontal grip portion 24 connecting between upper ends of the left and right handlebars 23, 23. The operation handle 18 has a U-shaped configuration.

A working clutch lever 26 and a traveling clutch lever 27 are pivotally connected to the upper ends of the handlebars 23, 23 for undergoing pivotal movement independently from each other. These levers 27 can be moved to turn in a forward direction and gripped by the human operator together with the grip portion 24. When a grip on the clutch levers 26, 27 is released, these levers 26, 27 automatically return to their original positions that are spaced away from the grip portion 24. Thus, the clutch levers 26, 27 are auto-return type operation members. The working clutch lever 26 is configured for manual operation by the human operator to perform engagement and disengagement of the working clutch (not shown). When the working clutch is engaged, motive power from the engine 14 is transmitted to the cutter blade 15. The traveling clutch lever 27 is configured for manual operation by the human operator to perform on-off control of the transmission 17 having a clutch function.

The operation handle 18 has an operation control lever 33 mounted on the left handlebar 23. The operation control lever 33 is provided for achieving manually control of the transmission 17. To this end, the operation control lever 33 is disposed in an area, which is accessible by the human operator to grip the operation control lever 33 with its one hand while the grip portion 24 of the operation handle 18 is gripped with the other hand of the human operator. In the illustrated embodiment, the operation control lever 33 is disposed adjacent to an upper end of the operation handle 18 and located inwardly of the operation handle 18 (that is, on an inner side of the left handlebar 23 which faces an inner side of the right handlebar 23). The operation control lever 33 and peripheral parts will be described below in detail with reference to FIGS. 2 to 5.

As shown in FIGS. 2-5, the left handlebar 23 has a bracket 31 to which a stay 32 is connected. The stay 32 pivotally supports a base portion 33a of the operation control lever 33. A peripheral portion of the base portion 33a is covered or concealed by a lever cover (first cover) 40 from above.

Figure 5:
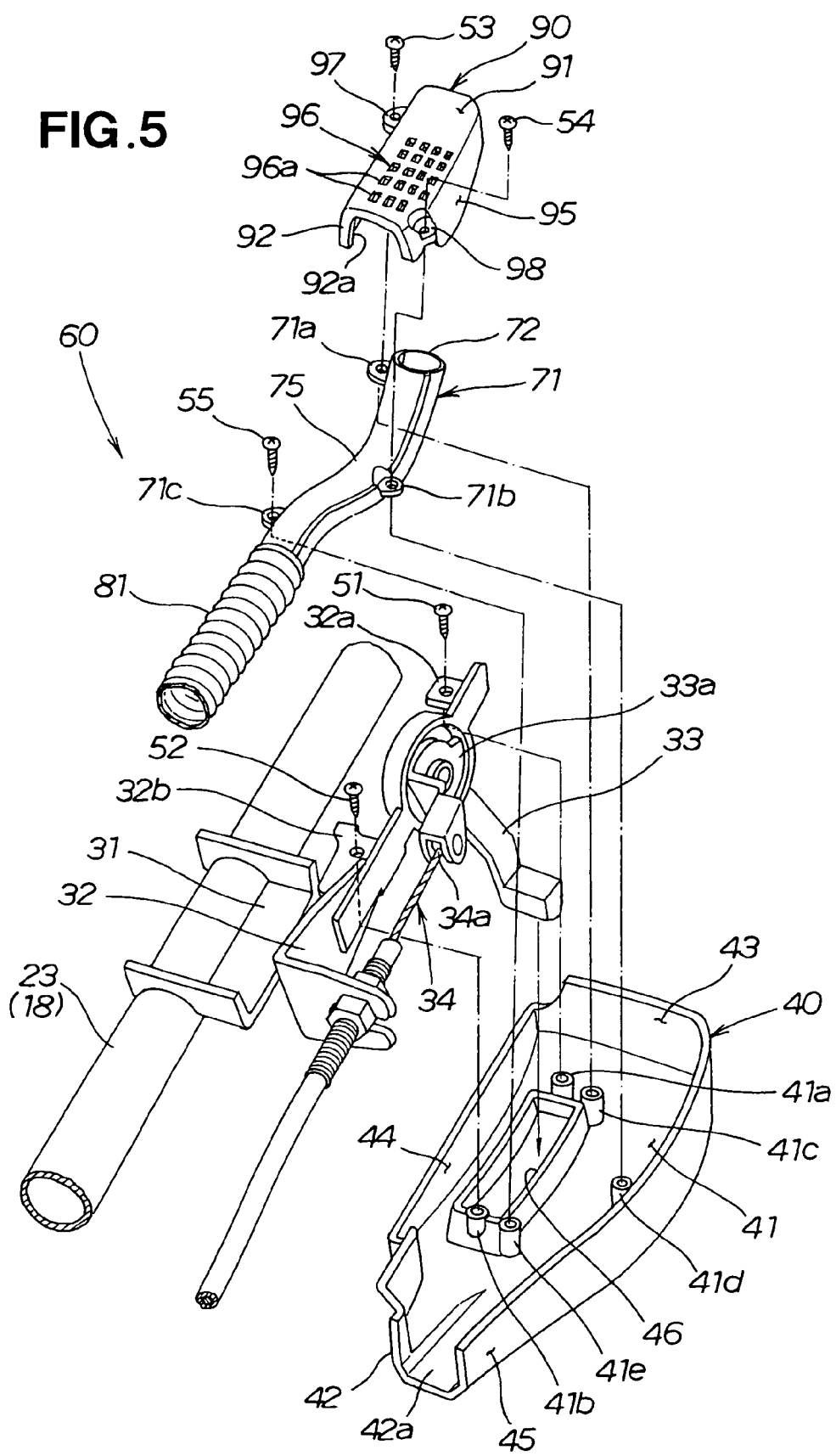
FIG. 5 is an exploded perspective view of FIG. 4.

The lever cover 40 has a generally rectangular box-like configuration open downward. More specifically, the lever cover 40 has a top wall 41 of generally rectangular shape and a peripheral wall extending along a peripheral edge of the top wall 41. As best shown in FIG. 5, the peripheral wall includes a front wall 42, a rear wall 43, a left sidewall 44 and a right sidewall 45. The lever cover 40 is molded of synthetic resin and has a one-piece unitary structure. The top wall 41 has an elongate opening 46 through which the operation control lever 33 extends. The operation control lever 33 extends upward from the base portion 33a thereof and projects from the opening 46 to the outside of the lever cover 40.

The front wall 42 of the lever cover 40 is a vertical plate facing the cutter deck 11 (FIG. 1). The rear wall 43 is a vertical plate facing the grip portion 24 (FIG. 1). The left sidewall 44 is a vertical plate disposed adjacent to the left handlebar 23. The right sidewall 45 is a vertical plate disposed in confrontation with the left sidewall 44.

Figure 4:
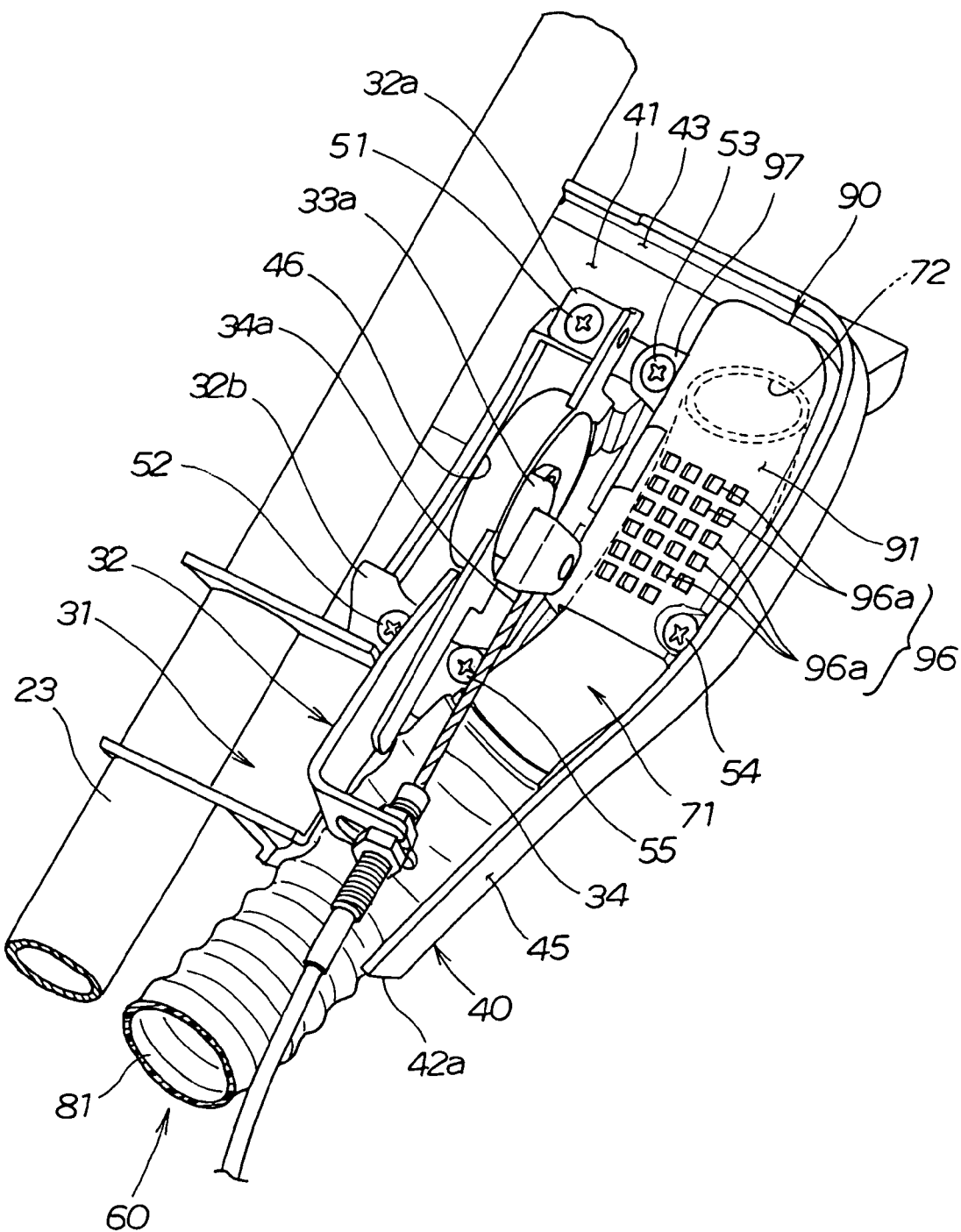
FIG. 4 is a view similar to FIG. 2 but showing the parts as viewed from below.

As shown in FIGS. 4 and 5, the lever cover 40 is removably mounted to the left handlebar 23 (namely, the operation handle 18) via the bracket 31 and the stay 32. More concretely, the stay 32 has a front flange 32a and a rear flange 32b, and the top wall 41 of the lever cover 40 has five bosses 41a to 41e projecting from an inside surface of the top wall 41.

The first boss 41a of the lever cover 40 is disposed adjacent to a rear edge of the rectangular opening 46, and the second boss 41b is disposed adjacent to a front edge of the rectangular opening 46. The third boss 41c is disposed next to the first boss 41a on the right, that is, the third-boss 41c is situated nearer the longitudinal centerline CL (FIG. 1) of the lawnmower 10 in relation to the first boss 41a. The fourth boss 41d is disposed adjacent to an inside surface of the right sidewall 45. The fifth boss 41e is disposed next to the second boss 41b on the right, that is, the fifth boss 41e is situated nearer the longitudinal centerline CL (FIG. 1) of the lawnmower 10 in relation to the second boss 41b.

The first boss 41a is connected by a first screw 51 to the front flange 32a of the stay 32. Similarly, the second boss 41b is connected by a second screw 52 to the rear flange 32b of the stay 32.

As shown in FIG. 4, the base portion 33a of the operation control lever 33 is connected to one end 34a of a wire cable 34. The wire cable 34 extends from the base portion 33a along the left handlebar 23 to the cutter deck 11 and is connected at the other end thereof to an actuator arm (not shown) of the transmission 17 (FIG. 1). By turning the operation control lever 33 in a front-back direction, the variable velocity of the transmission 17 can be adjusted via the wire cable 34.

Referring back to FIGS. 1 and 3, the engine-powered self-propelled walk-behind lawnmower 10 is equipped with the engine air intake system 60. The engine air intake system 60 generally comprises an air-cleaner case 61 (FIG. 1), an air intake portion 71 (FIG. 3), and a fresh air guide conduit or hose 81. The air-cleaner case 61 is mounted on a left side portion of the engine 14 (FIG. 1) and connected to an intake port of the engine 14. The air-cleaner case 61 houses therein an air-cleaner element 62 for filtering the outside air before it is supplied to the engine 14 for combustion. The air intake portion 71 is mounted on the operation handle 18 at a position remote from the air-cleaner case 61. The fresh air guide hose 81 forms a body of an air intake conduit, and the air intake portion 71 forms a remote air intake portion as a snorkel of the air intake conduit.

The fresh air guide hose 81 is provided to guide the fresh air (outside air) from the air intake portion 71 to the air-cleaner case 61. The fresh air guide hose 81 is formed from a flexible material such as a soft synthetic resin which is sufficiently flexible to allow smooth pivotal movement of the operation handle 18 when the operation handle 18 is moved between the solid-lined operating position and the phantom-lined storage position shown in FIG. 1.

It will be understood from the foregoing description that the engine air intake system 60 employs a so-called "snorkel air-cleaner structure" having a remote air intake portion 71 mounted on the operation handle 18 at a position far away from the ground surface, and a fresh air guide hose 81 connecting the air intake portion 71 and the air-cleaner case 61.

Figure 3:
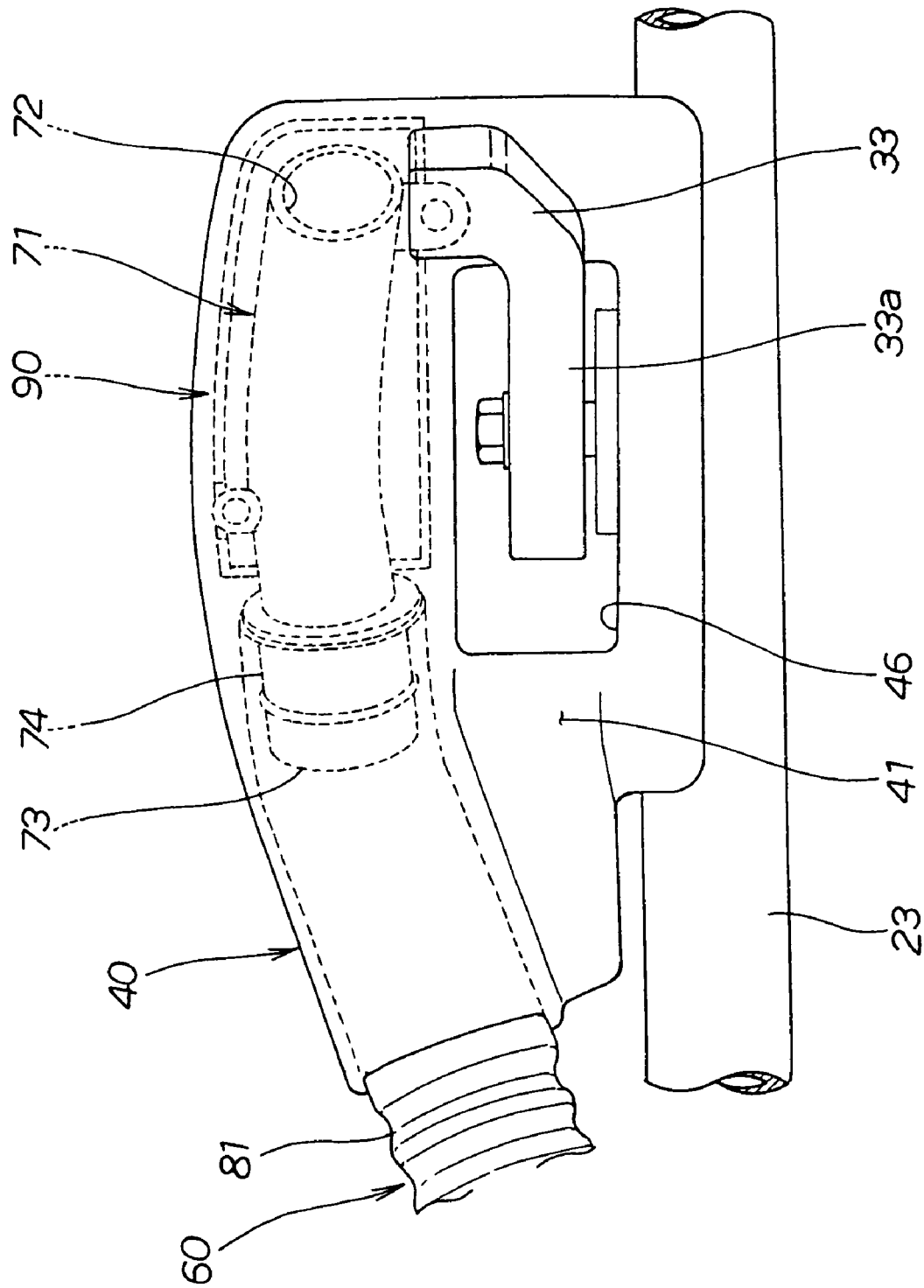
FIG. 3 is a top plan view of FIG. 2.

Structural details of the engine air intake system 60 will be described with reference to FIGS. 3-7. As shown in FIGS. 3-5, the lever cover 40 is bulged in a lateral inward direction toward the longitudinal centerline CL (FIG. 1) of the lawnmower 10 to the extent that the bulged portion of the lever cover 40 is receptive of the air intake portion 71 of the air intake system 60. The bulged portion is disposed in lateral juxtaposition with a main portion of the lever cover 40 which receives the base portion 33a of the operation control lever 33. Due to the presence of the bulged portion, the width of the lever cover 40 is enlarged at a portion including the bulged portion as compared to width of an end portion including the front wall 42.

Figure 6:
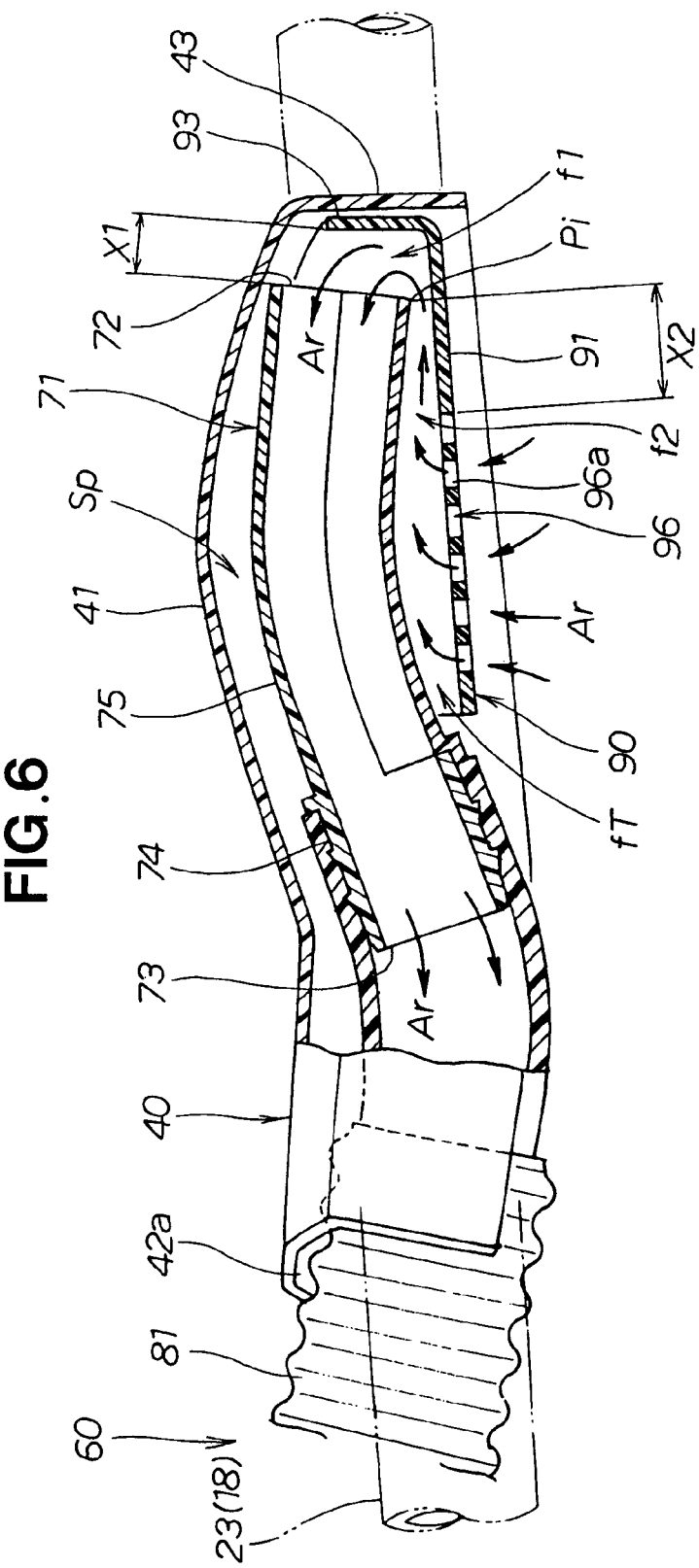
FIG. 6 is a cross-sectional view taken along line 6-6 of FIG. 2.

As shown in FIGS. 5-7, the air intake portion 71 is in the form of a pipe of circular cross-section and has an air inlet opening 72 formed at one end thereof and an air outlet opening 73 (FIG. 6) formed at the other end thereof. An end portion including the air outlet opening 73 has a connecting part or section 74 formed on an outer circumferential surface thereof. The air intake portion 71 has a curved part 75 disposed between the opposite ends of the air intake portion 71. The air intake portion 71 is formed by a pair of upper and lower segments or halves integrally joined together.

The air intake portion 71 of the foregoing construction is arranged to extend along the lest handlebar 23 of the operation handle 18 with its air inlet opening 72 facing in a downward direction (more particularly, in a rearward and downward direction) directed toward the rear wall 43 of the lever cover 40. The air outlet opening 73 faces in a forward and downward direction toward the air-cleaner case 61 (FIG. 1).

Figure 2:
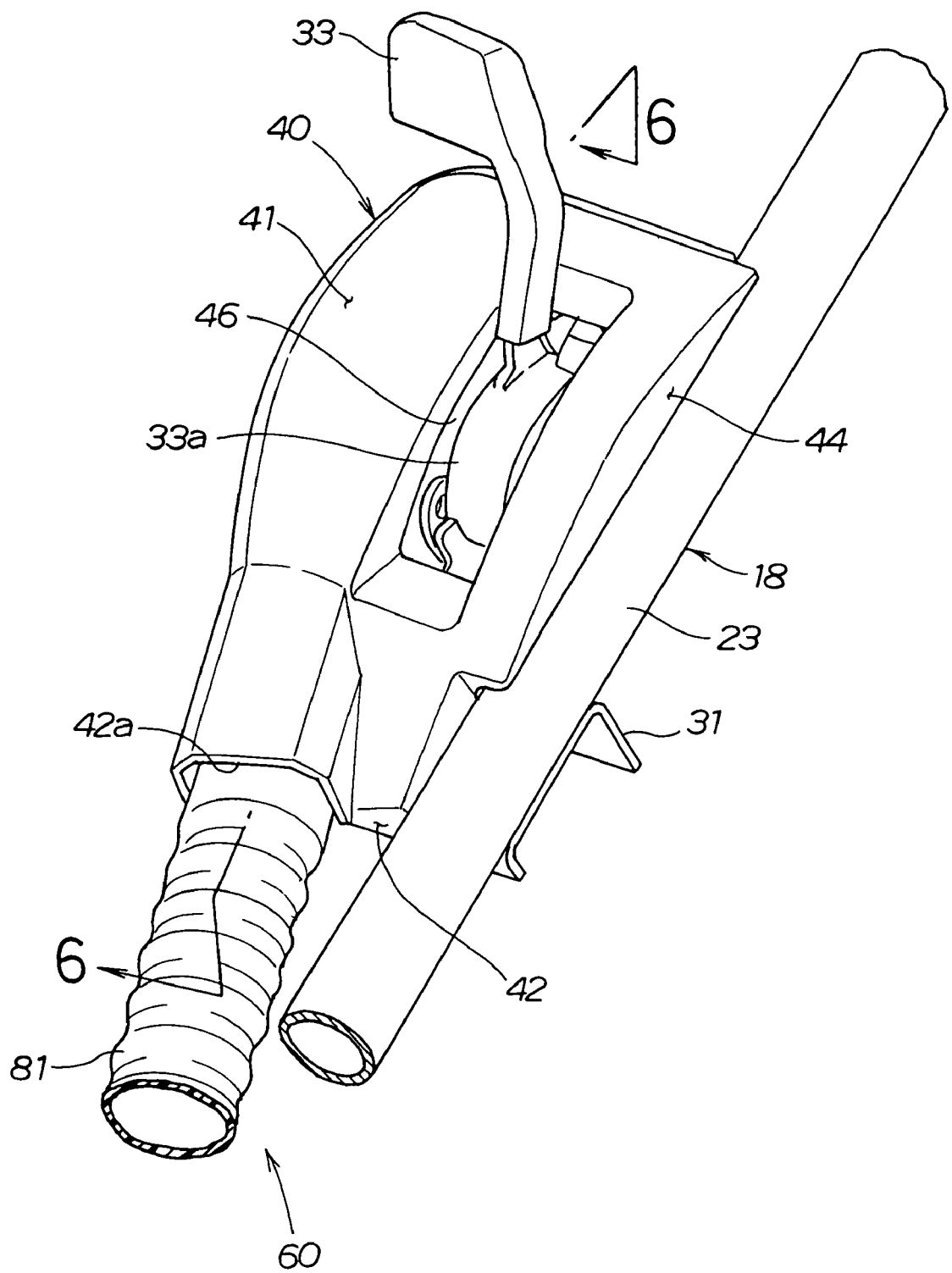
FIG. 2 is an enlarged view of a part of FIG. 1 including an operation control lever and peripheral parts thereof.

The connecting part 74 of the air intake portion 71 is directed toward the air-cleaner case 61. The fresh air guide hose 81 has one end connected by press-fitting with the connecting part 74 of the air intake portion 71. As shown in FIG. 2, the fresh air guide hose 81 passes through a cutout recess 42a formed in the front wall 42 of the lever cover 40, extends downward along the left handlebar 23 of the operation handle 18, and is connected to an air inlet 61a (FIG. 1) of the air-cleaner case 61.

As shown in FIGS. 5-7, the curved part 75 of the air intake portion 71 is a part which is gently curved into an upwardly convexed configuration extending contiguously from the air inlet opening 72 toward the air outlet opening 73 of the air intake portion 71. Thus the curved part 75 is convex upward from the air inlet opening 72. The radius of curvature of the curved part 75 is preferably set to a predetermined determined which is ale to secure passage of the fresh air through the air intake portion 71 without involving undue pressure loss.

As shown FIG. 5, the air intake portion 71 is detachably connected to the lever cover 40. More specifically, the air intake portion 71 has three flanges 71a, 71b and 71c arranged in a zigzag pattern on left and right sides of the air intake portion 71 such that one flange 71b is disposed on the right side of the air intake portion 71 and the remaining two flanges 71a and 71c on the left side of the air intake portion 71. The first flange 71a is disposed adjacent to the air inlet opening 72 of the air intake portion 71 and is connected by a third screw 53 to the third boss 41c of the lever cover 40. The second flange 71b is disposed intermediately between the inlet and outlet openings 73 and 74 and is connected by a fourth screw 54 to the fourth boss 41d of the lever cover 40. The third flange 71c is disposed adjacent to the air outlet opening 74 (FIG. 4) and is connected by a fifth screw 55 to the fifth boss 41e of the lever cover 40.

As shown in FIGS. 4-6, the operation handle 18 further includes a lower cover (second cover) 90 disposed beneath the lever cover 40. The lower cover 90 is configured to cover or conceal a longitudinal part of the air intake portion 71 including the air inlet opening 71 from a downward direction within the lever cover 40. The structural relationship between the air intake portion 71, the lever cover 40 and the lower cover 90 will be discussed below in detail.

As shown FIGS. 5 and 6, the lower cover 90 has a generally rectangular box-like configuration open upward (see FIG. 6). More specifically, the lower cover 90 has a bottom wall 91 of generally rectangular shape, and a peripheral wall extending along a peripheral edge of the bottom wall 91. As best shown in FIGS. 8A and 8B, the peripheral wall of the lower cover 90 includes a front wall 92, a rear wall 93, a left sidewall 94 and a right sidewall 95. The lower cover 90 is molded of synthetic resin and has a one-piece unitary structure.

The front wall 92 is a vertical plate facing the front wall 42 of the lever cover 40 and formed with a cutout recess 92a. The rear wall 93 is a vertical plate facing the rear wall 43 of the lever cover 40.

With an outside surface of the bottom wall 91 facing downward, the lower cover 90 is inserted in the lever cover 40 from below and attached to the top wall 41 of the lever cover 40 to thereby assemble together the lever cover 40 and the lower cover 90 with an hollow space Sp (FIG. 6) defined therebetween. More specifically, the hollow space Sp is defined jointly by and between the top wall 41 of the lever cover 40, the bottom wall 91, front wall 92, rear wall 93, left sidewall 94 and right sidewall 95 of the lower cover 90. The hollow space Sp communicates with the outside air through the cutout recess 92a formed in the front wall 92 of the lower cover 90.

The lever cover 40 serves also as an upper cover which defines the hollow space Sp together with the lower cover 90. This arrangement obviates the need for a separate upper cover for closing the open upper side of the lower cover 90 and is able to achieve corresponding reduction in production cost of the lawnmower 10.

By thus placing at least the air inlet opening 72 of the air intake portion 71 in the hollow space Sp defined jointly by and between the lever cover (upper cover) 40 and the lower cover 90, the engine air intake system 60 is able to take-in the outside air from the air inlet opening 72 of the air intake portion 71 via the hollow space Sp. In the illustrated embodiment, the air inlet opening 72 and the curved part 75 of the air intake portion 71 are disposed in the hollow space Sp while the connecting part 74 of the air intake portion 74 projects outward from the cutout recess 92a of the front wall 92 of the lower cover 90 and extends in a forward direction.

As shown in FIG. 6, the air inlet opening 72 of the air intake portion 71 faces the rear wall 93 of the lower cover 93 with a space f1 formed therebetween. The space f1 per se forms a first flow channel. A distance X1 between the air inlet opening 72 and the rear wall 93 is set to be relatively small as compared to a diameter of the air inlet opening 72. However, it is preferable to set the distance X1 to a value which is able to allow passage of the outside air through the first flow channel f1 without involving undue pressure loss and to prevent water from entering the first flow channel f1.

As shown in FIGS. 6, 8A and 8B, the bottom wall 91 of the lower cover 90 is flat and smooth and has a perforated portion 96 of net-like structure. The perforated portion 96 has a number of small holes or perforations 96a formed in a predetermined area of the bottom wall 91 of the lower cover 90. It may be said that the bottom wall 91 is a perforated plate having a number of perforations 96a arranged in a net-like or reticular pattern in a predetermined area of the perforated plate.

In the perforated portion 96 of the bottom wall 91, the perforations 96a may be arranged in a checkerboard pattern or a zigzag pattern. The shape, arrangement and size of the individual perforations 96a may be determined such that the perforations 96a allow passage of air without involving undue pressure loss and substantially block entry of external foreign matter including dust, insects, small pieces of stone and any type of water.

As shown in FIG. 6, the perforated portion 96 is offset from the air inlet opening 72 toward a forward direction of the lawnmower (leftward direction in FIG. 6). Reference character X2 denotes a minimum distance or offset between the position Pi of the air inlet opening 72 and the perforated portion 96. With the perforated portion 96 thus provided, the outside air can be taken into the air intake portion 71 from the air inlet opening 71 successively through the perforations 96a of the lower cover 90 and the hollow space Sp defined between the upper cover (ever cover) 40 and the lower cover 90. The perforated portion 96 and the air inlet opening 72 are held out of vertical alignment with each other.

The hollow space Sp includes a second flow channel f2 defined between the perforated bottom wall portion 96 and left and right sidewalls 93, 94 of the lower cover 90 and an outer peripheral surface of the air intake portion 71. The perforations 96a, the first flow channel f1, the second flow channel f2, the air inlet opening 72 and an hollow space of the air intake portion 71 together form a labyrinthine air flow passage fT.

As shown in FIGS. 4 and 5, the lower cover 90 is detachably connected to the lever cover 40. More specifically, the lower cover 90 has two lateral flanges 97 and 98 formed on its left and right sides. The first flange 97 is disposed adjacent to the rear wall 93 (FIG. 6) of the lower cover 90, and the second flange 98 is disposed adjacent to the front wall 92 of the lower cover 90. The first flange 97 of the lower cover 90 is connected by the third screw 53 to the third boss 41c of the lever cover 40 together with the first flange 71a of the air intake portion 71. The second flange 98 of the lower cover 90 is connected by the fourth screw 54 to the fourth boss 41d of the lever cover 40 together with the second flange 71b of the air intake portion 71. Thus, the same screw fasteners (third and fourth screws 53, 54) are commonly used to attach both of the air intake portion 71 and the lower cover 90 to the lever cover (upper cover) 40.

Figure 9:
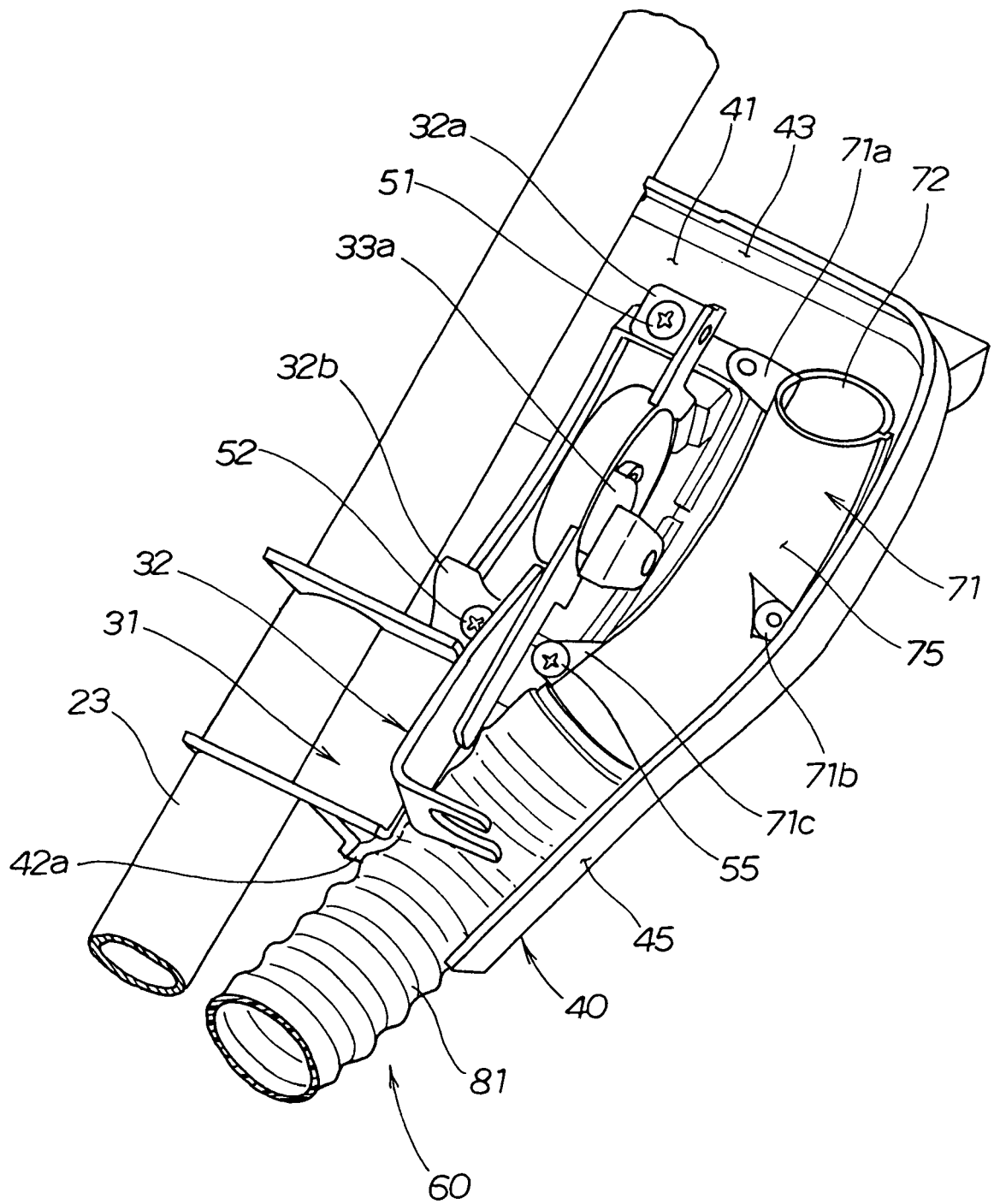
FIG. 9 is a view similar to FIG. 4 but showing the operation control lever and the peripheral parts thereof with the lower cover removed.

Referring next to FIGS. 1, 4, 5 and 9, a description will be made to a manner in which the lever cover 40, the air intake portion 71 and lower cover 90 are assembled on the operation handle 18. FIG. 9 is a view similar to FIG. 4 but showing the operation control lever 33 and peripheral portions thereof with the lower cover 90 removed for clarity.

Assembling operation begins with the operation handle 19 placed in the forwardly folded horizontal storage position indicated by phantom lines shown in FIG. 1. By thus placing the operation handle 18 in the phantom-lined storage position, highly efficient assembly can be achieved. FIG. 5 shows the left handlebar 28 of the forwardly folded operation handle 18. As shown in FIG. 5, the base portion 33a of the operation control lever 33 is pivotally connected to the stay 32 of the left handlebar 23, and one end of the wire cable 34 is connected to the base portion 33a of the operation control lever 33.

Then, with its open side facing upward, the lever cover 40 is placed from a downward direction over the base portion 33a of the operation control lever 33 until it covers or conceals the base portion 33a with the operation control lever 33 projecting downwardly from the opening 46 of the lever cover 40. Subsequently, the lever cover 40 is adjusted in position relative to the stay 32 so that the first and second bosses 41a and 41b of the lever cover 40 are aligned respectively with the first and second flanges 32a and 32b of the stay 32. While being kept in such aligned condition, the first and second flanges 32a, 32b of the stay 32 and the first and second bosses 41a, 42 of the lever cover 40 are connected together by the first and second screws 51 and 52, respectively. Then, the air intake portion 71 and an end portion of the fresh air guide hose 81 connected to the air intake portion 71 are placed in the lever cover 40 from above.

Subsequently, the third flange 71c of the air intake portion 71 is first placed on the fifth boss 41e of the lever cover 40 and then connected to the fifth boss 41e by the fifth screw 55. Thus, the air intake portion 71 is attached to the lever cover 40 as shown in FIG. 9. In FIG. 9, the wire cable 34 is omitted from illustration for clarity. As shown in FIG. 9, the air intake portion 71 is disposed in lateral juxtaposition with the operation control lever 33 within the lever cover 40.

Then, as shown in FIG. 5, with its open side facing downward, the lower cover 90 is placed over the air intake portion 71 such that the first flange 71a of the air intake portion 71 and the first flange 97 of the lower cover 90 are stacked in the order named on the third boss 41c of the lever cover 40, and the second flange 71b of the air intake portion 71 and the second flange 98 of the lower cover 90 are stacked in the order named on the fourth boss 41d of the lever cover 40. While keeping such stacked condition, the stacked first flanges 71a, 97 are concurrently connected to the third boss 41c by the third screw 53, and the stacked second flanges 71b, 98 are concurrently connected to the fourth boss 41d by the fourth screw 54. Thus, the lower cover 90 and the air intake portion 71 are attached to the lever cover 40 as shown in FIG. 4.

Since the same screw fasteners (third and fourth screws) 53, 54 are commonly used for attaching both of the air intake portion 71 and the lower cover 90 to the lever cover 40, it is possible to reduce a total number of screws used for assembly and increase the assembling efficiency.

The engine air intake system 60 of the foregoing construction will operates in a manner as described below. As shown in FIG. 1, when the lawnmower 10 is to be used for achieving mowing operation, the operation handle 18 is set in the phantom-lined operating position in which the air intake portion 71 assumes a posture shown in FIG. 6. When the engine 14 (FIG. 1) is started, a negative pressure is developed in the engine air intake system 60 during each intake stroke of the engine 14. By the effect of the negative pressure, the outside air Ar is drawn from the perforated portion 96 of the lower cover 90 into the hollow space Sp defined between the lever cover (upper cover) 40 and the lower cover 90. During that time, since the perforated portion 96 has a net-like structure, external foreign matter such as grass clippings, insects or small pieces of stone is prevented from entering the hollow space Sp from the perforations 96a of the lower cover 90.

The fresh air Ar then flows downstream along the second flow channel f2 defined between the outer peripheral surface of the air intake portion 71, the bottom wall 91 of the lower cover 90 and left and right sidewalls 94, 95 (FIG. 8B) of the lower cover 90. As the fresh air Ar advances along the second flow channel f2 toward the rear wall 93 of the lower cover 90, it reaches the first flow channel f1. The fresh air Ar then enters the first flow channel f1 and flows upward along the first flow channel f1 during that time the rear wall 93 guides the fresh air Ar in such a manner as to make a U turn and enter the air intake portion 71 from the air inlet opening 72. Subsequently, the fresh air Ar is guided to flow downstream along the air intake portion 71 toward the air outlet 73 of the air intake portion 71.

It will be appreciated that the fresh air Ar passes through the labyrinthine air flow passage fT formed jointly by the perforations 96a of the lower cover 90, the first flow channel f1, the second flow channel f2, the air inlet opening 72 and the hollow space of the air intake portion 71. Subsequently, the fresh air Ar enters the fresh air guide hose 81 and flows downstream along the fresh air guide hose 81. Finally, the fresh air Ar is introduced into the air-cleaner case 61 (FIG. 1) via the fresh air guide hose 81. In the air-clearer case 61, the fresh air is filtered by the air-cleaner element 62 and eventually supplied through an intake passage (not shown) to the engine 14.

Since the air inlet opening 72 of the air intake portion 71 is located within the hollow space Sp defined by and between the lever cover (upper cover) 40 and the lower cover 90, dust produced during mowing operation can hardly enter the air intake portion 71 from the air inlet opening 72. When the lawnmower 10 is subjected to rainfall, the lever cover 40 and the lower cover 40 jointly block rainwater Wt (FIG. 7) from getting into the hollow space Sp defined between the lever cover 40 and the lower cover 90. Thus, the air intake portion 71 received in the hollow space Sp is completely protected from rainwater ingestion.

After mowing operation, the engine 14 is stopped and the operation handle 18 is brought to the forwardly folded horizontal storage position as indicated by phantom lines shown in FIG. 1. In this instance, the air intake portion 71 assumes a posture shown in FIG. 10.

Figure 10:
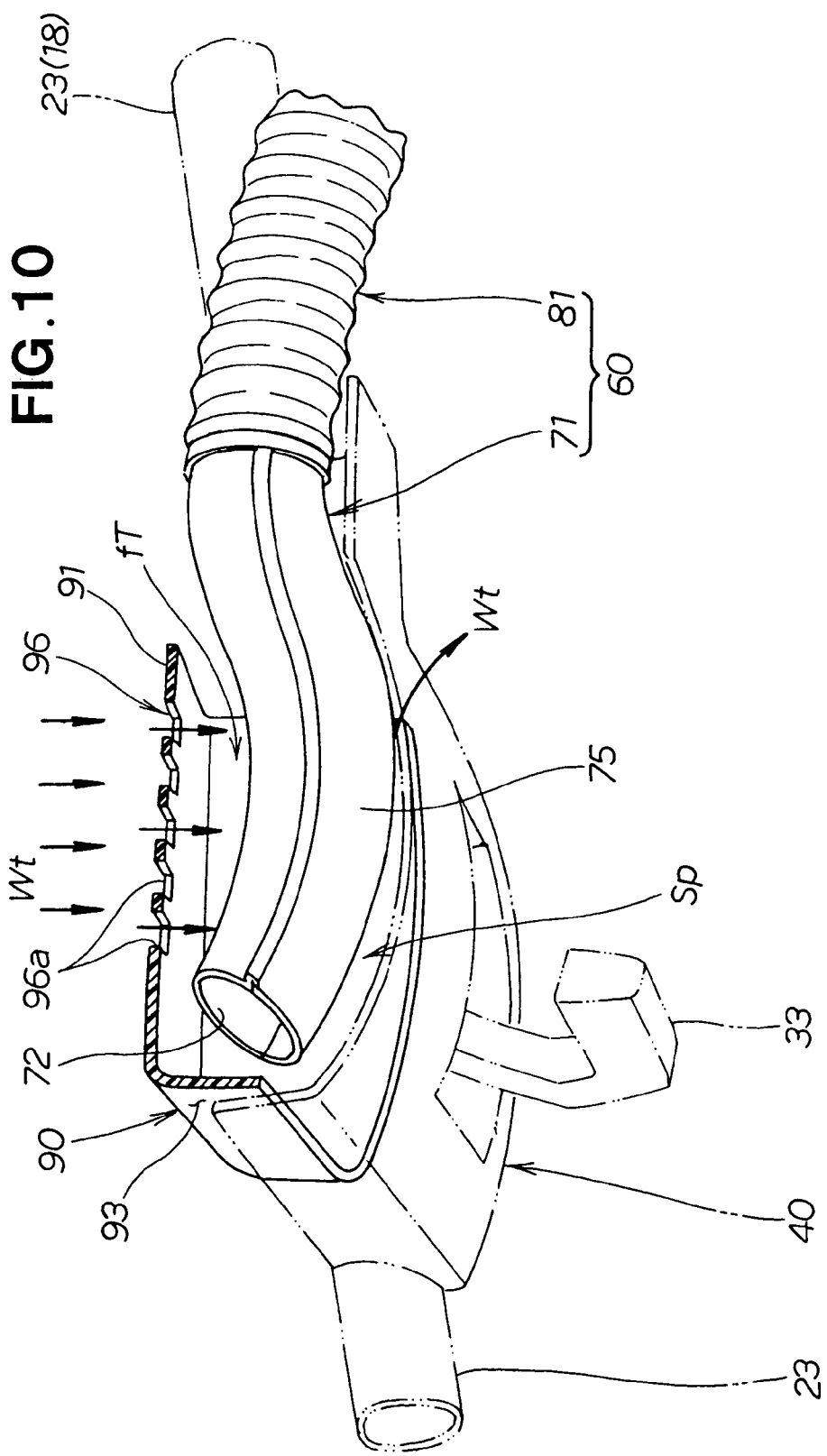
FIG. 10 is a perspective view, with parts broken away for clarity, illustrative of an operation of the air intake portion and the lower cover when an operation handle of the lawnmower is disposed in a forwardly folded horizontal storage position.

Since the operation handle 18 is now lying upside down as shown in FIG. 10, the lever cover 40, the air intake portion 71 and the lower cover 90 are also placed upside down. In this condition, because the perforated portion 96 of the lower cover 90 faces upward, rainwater Wt is allowed to enter the hollow space Sp from the perforations 96a formed in the perforated portion 96 of the lower cover 90. However, since the perforated portion 96 of the lower cover 90 is offset from the air inlet opening 72 of the air intake portion 71, the rainwater Wt cannot reach the air inlet opening 72 via a part of the labyrinthine air flow passage fT formed jointly by the perforations 96a, the second flow channel f2 (FIG. 6) and the first flow channel f1 (FIG. 6). Instead, the rainwater is drained from the cutout recess 42a (FIG. 6) of the lever cover 40 before it reaches to a level of the air inlet opening 72 of the air intake portion 71. In this instance, because the air inlet opening 72 faces in an upward direction, rainwater can hardly enter the air intake portion 71 from the air inlet opening 72.

As thus far described, a part of the air intake portion 71 including the air inlet opening 72 is received in an hollow space Sp defined between the lever cover (upper cover) 40 and the lower cover 90 as shown in FIG. 6. This arrangement ensures that the outside air Ar is first introduced from the air inlet opening 72 into the air intake portion 71 via the hollow space Sp and thence introduced into the air-cleaner case 61 (FIG. 1) via the fresh air guide hose 81. Since the air inlet opening 72 of the air intake portion 71 is surrounded jointly by the lever cover 40 and the lower cover 90, this arrangement is able to prevent water ingestion which may otherwise occur at the air inlet opening 72 when the lawnmower 10 (FIG. 1) is subjected to rainfall or washed with water. By thus providing the air inlet opening 72 which is highly resistant to water ingestion, the air-cleaner element 62 is able to offer the best possible performance. Furthermore, since the filtered fresh air is free from water, a carburetor (not shown) and the engine 14 have no risk of encountering a problem resulting from water ingestion.

Additionally, because the air inlet opening 72 of the air intake portion 71 is surrounded jointly by the lever cover 40 and the lower cover 90, as previously described, dust produced during mowing operation can hardly enter the air intake portion 71 from the air inlet opening 72. Furthermore, since the air intake portion 71 formed with the air inlet opening 72 is disposed adjacent to the operation control lever 33 mounted on the operation handle 18 of the lawnmower 10, the air inlet opening 72 of the engine air intake system 60 is located far away from the ground surface. By thus arranging the air inlet opening 72, the air-cleaner element 62 is kept substantially from clogging which may otherwise occur due to dust produced during mowing operation of the lawnmower 10.

The air inlet opening 72 faces in a downward direction as shown in FIG. 6. This arrangement is particularly effective to prevent water ingestion which may otherwise occur at the air inlet opening 72 when the lawnmower 10 is subjected to rainfall or washed with water. Furthermore, by virtue of the curved portion 75 of upwardly convexed configuration extending contiguously from the air inlet opening 72 toward the air outlet opening 73, the air intake portion 71 is able to drain water from the air inlet portion 72 by gravity even when water ingestion occurs at the air inlet portion 72.

The position of the air intake portion 71 is offset from the position of the operation control lever 33 toward a longitudinal centerline CL of the lawnmower 10. With this arrangement, the fresh air guide hose 81 connected to the air intake portion 71 is also offset from the wire cable 34 connected to the operation control lever 33 toward the longitudinal centerline CL of the lawnmower 10. When the operation handle 18 is turned to move from the solid-lined operating position of FIG. 1 to the phantom-lined forwardly folded horizontal storage position of FIG. 1, the wire cable 34 and the fresh air guide hose 81 are bent at their respective portions located near a pivot axis of the operation handle 18. In this instance, because the wire cable 34 and the fresh air guide hose 81 are offset from each other in a widthwise direction of the lawnmower 10, they are kept free from interference with each other which may otherwise occur due to a difference in flexibility between the wire cable 34 and the fresh air guide hose 81 when the wire cable 34 and the fresh air guide hose 81 are arranged without a lateral space or offset therebetween.

The engine-powered working machine 10 should by no means be limited to the engine-powered self-propelled walk-behind lawnmower as in the illustrated embodiment but may include other types of working machines such as agricultural working machines, earth-moving machines, or lorries provided that the working machines have a traveling ability and an operation handle for operation by a human operator. In case of a walk-behind lawnmower, the transmission 17 may be omitted.

The operation control lever 33 may be arranged to manually control operation of at least one of the working machine 10 and the engine 14. For instance, the operation control lever 33 may be so configured as to adjust the opening of a throttle valve (not shown) of the engine 14. It is further possible according to the invention to provide a plurality of operation control levers in which instance one of the operation control levers is used for adjusting the variable velocity of the transmission 17 to thereby control operation of the working machine 10, and another operation control lever is used for adjusting the engine throttle valve to thereby control operation of the engine 17.

Control of the working machine 10 performed by the operation control lever 33 may include control of a working unit (such as an adjustment of rotational speed of the cutter blade 15 of the lawnmower 10) or control of a traveling unit (such as an adjustment of rotational speed of the rear wheels 13 of the lawnmower 10). The traveling unit may be a crawler unit. Control of the engine performed by the operation control lever 33 may include an adjustment of output power or rotational speed of the engine 14.

The screws 51-55 are a kind of fasteners used to join two or more parts together. The screws 51-55 may be replaced by bolts, rivets or clips.

Assembly of the operation control lever 33, the lever cover 40, the air intake portion 71 and the lower cover 90 relative to the operation handle 18 may be achieved with the operation handle 18 kept in the solid-lined operating position of FIG. 1.

The present invention is particularly advantageous when embodied in an air intake system of an engine-powered walk-behind lawnmower.

Obviously, various minor changes and modifications of the present invention are possible in light of the above teaching. It is therefore to be understood that within the scope of the appended claims the invention may be practiced otherwise than as specifically described.

What is claimed is:

1. An engine air intake system for an engine-powered walk-behind working machine having an operation handle connected at one end to a body of the working machine for operation by a human operator to steer the working machine, and an operation control lever mounted to the operation handle for operation by the human operator to control operation of at least one of the working machine and an engine mounted on the body of the working machine, said engine air intake system comprising:

an air-cleaner case mountable on the engine and having an air-cleaner element accommodated within the air-cleaner case;

a first cover which covers at least a base portion of the operation control lever from above;

a second cover disposed inside the first cover so as to define jointly with the first cover a hollow space, the hollow space communicating with the outside air;

an air intake portion having an air inlet opening for introducing therefrom the outside air into the air intake portion, the air intake portion being disposed in the first cover such that at least the air inlet opening is disposed within the hollow space defined between the first and second covers; and a fresh air guide conduit interconnecting the air intake portion and an internal space of the air-cleaner case.

2. The engine air intake system of claim 1, wherein the second cover has a perforated portion of net-like structure for allowing passage therethrough of the outside air, the perforated portion and the air inlet opening being held out of vertical alignment with each other.

3. The engine air intake system of claim 2, wherein the perforated portion of the second cover is offset from the air inlet opening in a forward direction of the working machine.

4. The engine air intake system of claim 1, wherein the air inlet opening of the air intake portion faces in a downward direction, and the air intake portion has a curved part of upwardly convexed configuration extending contiguously from the air inlet opening.

5. The engine air intake system of claim 1, wherein the air intake portion and the second cover are connected to the first cover by a common fastener.

* * * * *